(12) United States Patent
Delihas et al.

(10) Patent No.: US 9,879,829 B2
(45) Date of Patent: Jan. 30, 2018

(54) TANK MODULE INTERFACE FOR FLUID RESERVOIRS

(75) Inventors: Nicholas C. Delihas, Fort Myers, FL (US); Steven Milette, Naples, FL (US); John R. Koonce, Naples, FL (US); Donald G. Gardner, Cape Coral, FL (US)

(73) Assignee: Shaw Development, LLC, Bonita Springs, FL (US)

( * ) Notice: Subject to any disclaimer, the term of this patent is extended or adjusted under 35 U.S.C. 154(b) by 558 days.

(21) Appl. No.: 13/702,325

(22) PCT Filed: Jun. 15, 2011

(86) PCT No.: PCT/US2011/040432
§ 371 (c)(1),
(2), (4) Date: Oct. 15, 2013

(87) PCT Pub. No.: WO2011/159752
PCT Pub. Date: Dec. 22, 2011

(65) Prior Publication Data
US 2014/0026990 A1    Jan. 30, 2014

Related U.S. Application Data

(60) Provisional application No. 61/354,953, filed on Jun. 15, 2010.

(51) Int. Cl.
*F17D 3/01* (2006.01)
*F01N 3/035* (2006.01)
*B60K 15/03* (2006.01)

(52) U.S. Cl.
CPC ............... *F17D 3/01* (2013.01); *B60K 15/03* (2013.01); *F01N 3/035* (2013.01);
(Continued)

(58) Field of Classification Search
CPC ......... F01N 2610/00; F01N 2610/1406; F01N 2610/02; F01N 3/035
(Continued)

(56) References Cited

U.S. PATENT DOCUMENTS 2,862,354 A    9/1954    Barnhart
2,975,586 A    7/1959    Bray
(Continued)

FOREIGN PATENT DOCUMENTS

DE    102004036508    3/2006
EP    1561626    8/2005
(Continued)

*Primary Examiner* — John K Fristoe, Jr.
*Assistant Examiner* — Josephine Trinidad-Borges
(74) *Attorney, Agent, or Firm* — Hahn Loeser & Parks, LLP

(57) ABSTRACT

The combination of a reservoir having an interface defining an aperture, the interface including a wall extending into the reservoir, the reservoir having a recessed groove in an upper surface about the aperture, the recessed groove including a plurality of recesses thereon: a head unit having an exterior shape complementary to the shape of the aperture, the head unit being positioned within the aperture; the head unit having an inwardly extending rim corresponding to the aperture circular wall, the head unit including a lug, the head unit lug engaging one of recesses, the head unit having a seal ring about an outer periphery of the head unit inwardly extending rim, the seal ring engaging the aperture wall and the head unit inwardly extending rim.

16 Claims, 8 Drawing Sheets

(52) U.S. Cl.
CPC *B60K 2015/03243* (2013.01); *F01N 2610/00* (2013.01); *F01N 2610/02* (2013.01); *F01N 2610/1406* (2013.01); *Y10T 137/8342* (2015.04)

(58) Field of Classification Search
USPC .................. 137/334, 558; 60/295; 251/144
See application file for complete search history.

(56) References Cited

U.S. PATENT DOCUMENTS

| | | | |
|---|---|---|---|
| 2,932,364 A | | 4/1960 | Binter |
| 4,960,153 A | * | 10/1990 | Bergsma ................. 137/587 |
| 4,972,875 A | * | 11/1990 | Beer et al. ............... 137/590 |
| 5,083,583 A | * | 1/1992 | Benjey ..................... 137/587 |
| 5,092,304 A | | 3/1992 | McNelley |
| 5,329,899 A | * | 7/1994 | Sawert et al. ......... 123/198 DB |
| 5,423,373 A | | 6/1995 | Ramberg |
| 5,762,049 A | * | 6/1998 | Jones et al. .............. 123/514 |
| 6,591,857 B2 | * | 7/2003 | Engle et al. .............. 137/202 |
| 6,681,811 B2 | | 1/2004 | Channing |
| 7,017,336 B2 | | 3/2006 | Stiermann |
| 7,398,771 B2 | | 7/2008 | Theorell et al. |
| 7,497,075 B2 | | 3/2009 | Ripper et al. |
| 7,544,328 B2 | * | 6/2009 | Osaku et al. ............. 422/527 |
| 7,665,347 B2 | | 2/2010 | Sasanuma et al. |
| 7,677,631 B1 | | 3/2010 | Zischke et al. |
| D619,688 S | | 7/2010 | Gismervik |
| D621,015 S | | 8/2010 | Gismervik |
| D622,833 S | | 8/2010 | Gismervik |
| D625,396 S | | 10/2010 | Gismervik |
| 7,836,684 B2 | | 11/2010 | Starck et al. |
| 8,069,649 B2 | | 12/2011 | Matsunaga |
| 8,087,239 B2 | | 1/2012 | Bugos et al. |
| 8,088,336 B2 | | 1/2012 | Suzuki et al. |
| 8,096,112 B2 | | 1/2012 | Dalton |
| 8,104,269 B2 | | 1/2012 | Gonze et al. |
| 8,117,830 B2 | | 2/2012 | Hiranuma et al. |
| 8,117,833 B2 | | 2/2012 | Sakimoto et al. |
| 8,117,834 B2 | | 2/2012 | Toshioka et al. |
| 8,122,710 B2 | | 2/2012 | Schmale et al. |
| 8,127,538 B2 | | 3/2012 | Pollitt et al. |
| 8,234,854 B2 | | 8/2012 | Kesse et al. |
| 8,240,130 B2 | | 8/2012 | Sawada et al. |
| 8,240,136 B2 | | 8/2012 | Kurtz et al. |
| 8,240,137 B2 | | 8/2012 | Liu et al. |
| 8,241,577 B2 | | 8/2012 | Georis et al. |
| 8,241,598 B2 | | 8/2012 | Frederiksen |
| 8,245,504 B2 | | 8/2012 | Kowada |
| 8,246,922 B2 | | 8/2012 | Boorse et al. |
| 8,250,857 B2 | | 8/2012 | Driscoll et al. |
| 8,253,578 B2 | | 8/2012 | Watabe et al. |
| 2003/0094458 A1 | * | 5/2003 | Beyer ............... B60K 15/03519 220/562 |
| 2005/0121463 A1 | * | 6/2005 | Johnson et al. ............ 222/57 |
| 2005/0241845 A1 | | 11/2005 | Burke et al. |
| 2006/0213473 A1 | | 9/2006 | Theorell et al. |
| 2007/0157602 A1 | * | 7/2007 | Gschwind ................. 60/274 |
| 2007/0202019 A1 | * | 8/2007 | Nishina et al. ............ 422/163 |
| 2008/0143345 A1 | | 6/2008 | Boudaoud et al. |
| 2009/0028533 A1 | | 1/2009 | Starck |
| 2009/0038296 A1 | | 2/2009 | Fukuda et al. |
| 2009/0078692 A1 | | 3/2009 | Starck |
| 2009/0107116 A1 | | 4/2009 | Barber et al. |
| 2009/0127265 A1 | | 5/2009 | Magnusson et al. |
| 2009/0139214 A1 | | 6/2009 | Reed |
| 2009/0145903 A1 | | 6/2009 | Soltis et al. |
| 2009/0188923 A1 | * | 7/2009 | Versaw et al. ............. 220/564 |
| 2009/0205320 A1 | | 8/2009 | Mokire et al. |
| 2009/0230136 A1 | | 9/2009 | Dougnier et al. |
| 2009/0282813 A1 | | 11/2009 | Kopinsky |
| 2010/0025408 A1 | | 2/2010 | Haeberer et al. |
| 2010/0028219 A1 | | 2/2010 | Goebelbecker |
| 2010/0050603 A1 | * | 3/2010 | Seino et al. ................ 60/282 |
| 2010/0050606 A1 | | 3/2010 | Fulks et al. |
| 2010/0089037 A1 | | 4/2010 | Bogema et al. |
| 2010/0146940 A1 | | 6/2010 | Goulette et al. |
| 2010/0154907 A1 | * | 6/2010 | Lecea et al. ............. 137/565.29 |
| 2010/0162690 A1 | | 7/2010 | Hosaka et al. |
| 2010/0175369 A1 | | 7/2010 | Op De Beeck et al. |
| 2010/0220984 A1 | | 9/2010 | Potier et al. |
| 2010/0224284 A1 | | 9/2010 | Kolberg et al. |
| 2010/0236243 A1 | | 9/2010 | Lolas et al. |
| 2010/0303453 A1 | * | 12/2010 | Haeberer et al. .......... 392/449 |
| 2011/0083989 A1 | * | 4/2011 | Whelan ............... F02M 37/0076 206/524.6 |
| 2011/0301868 A1 | | 12/2011 | Anderson et al. |
| 2012/0020857 A1 | | 1/2012 | Isada et al. |
| 2012/0031082 A1 | | 2/2012 | Gismervik |
| 2012/0198823 A1 | | 8/2012 | Amstutz |

FOREIGN PATENT DOCUMENTS

| | | |
|---|---|---|
| EP | 1582732 | 10/2005 |
| EP | 1662103 | 5/2006 |
| EP | 2409007 | 9/2010 |
| JP | 2003025857 | 1/2003 |
| JP | 2008267682 | 11/2008 |
| JP | 2009138551 | 6/2009 |
| JP | 20100156284 | 7/2010 |

\* cited by examiner

TANK MODULE INTERFACE FOR FLUID RESERVOIRS

RELATED PATENT APPLICATIONS

This application claims priority from U.S. Provisional Patent application Ser. No. 61/354,953, filed on Jun. 15, 2010.

The present invention relates generally to tanks and reservoirs used in vehicles. More specifically, the present application relates to a mounting interface for attaching fluid or electrical connections to such a tank or reservoir.

BACKGROUND OF THE INVENTION

Diesel Exhaust Fluid reservoirs will become standard on diesel powered ground vehicles beginning in 2011 in the United States of America. These reservoirs generally hold aqueous urea solutions for use with pollution abatement systems. These reservoirs will have multiple connections to other systems on the vehicles. Because of the multiple connections, multiple liquid tight seals are required for each connection. Ordinarily, these connections are attached by threaded fasteners and rely on these fasteners to form and maintain a liquid or vapor tight seal. Consequently, these connections suffer the disadvantage that if the fasteners loosen or are not properly torqued, an effective seal will not be maintained.

BRIEF SUMMARY

The present invention includes a mounting interface that does not depend on the compression of a fastening system to ensure a liquid tight seal. The present invention may further include a multi-function head that has multiple connectors such that multiple connections may be attached to the head and simultaneously attached via the head at the mounting interface. One embodiment includes a mounting interface adapted to receive the multi-function head formed in a Diesel Exhaust fluid (DEF) reservoir. However, the mounting interface can be used with other fluid reservoirs.

In one embodiment, the invention comprises the combination of a reservoir having an aperture therein; a head unit having an exterior shape complementary to the shape of the aperture, the head unit being positioned within the aperture; a seal ring about an outer periphery of the head unit, the seal ring engaging an interior circumferential surface of the aperture; and a head unit securement retainingly attaching the head unit to the reservoir.

In a further embodiment, the invention comprises the combination of a reservoir having an aperture therein, the aperture including a cylindrical wall extending into the reservoir, the reservoir having a recessed groove in an upper surface about the aperture, the recessed groove including a plurality of recesses thereon; a head unit having an exterior shape complementary to the shape of the aperture, the head unit being positioned within the aperture; the head unit having an inwardly extending rim corresponding to the cylindrical wall, the head unit including a lug, the head unit lug engaging one of recesses, the head unit having a seal ring about an outer periphery of the head unit downwardly extending rim, the seal ring engaging the cylindrical wall and the head unit downwardly extending rim; and a head unit securement retainingly attaching the head unit to the reservoir.

In a further embodiment, the invention includes a head unit comprising a head unit; a plurality of fluid connections extending from an upper side of the head unit to a lower side of the head unit; a temperature sensor attached to the lower side of the head unit; a level sensor attached to the head unit; a heater tube attached to the lower side of the head unit; two of the fluid connections extending into the interior of the heater tube, one of said two fluid connections extending to a lower end of the heater tube, the other of said two fluid connections terminating proximate the lower side of the head unit; a suction tube connected to a further one of the fluid connections, the suction tube extending outside of the heater tube; a further one of the fluid connections terminating proximate the lower side of the head unit outside of the heater tube.

DETAILED DESCRIPTION OF A PREFERRED EMBODIMENT

Figure 1:
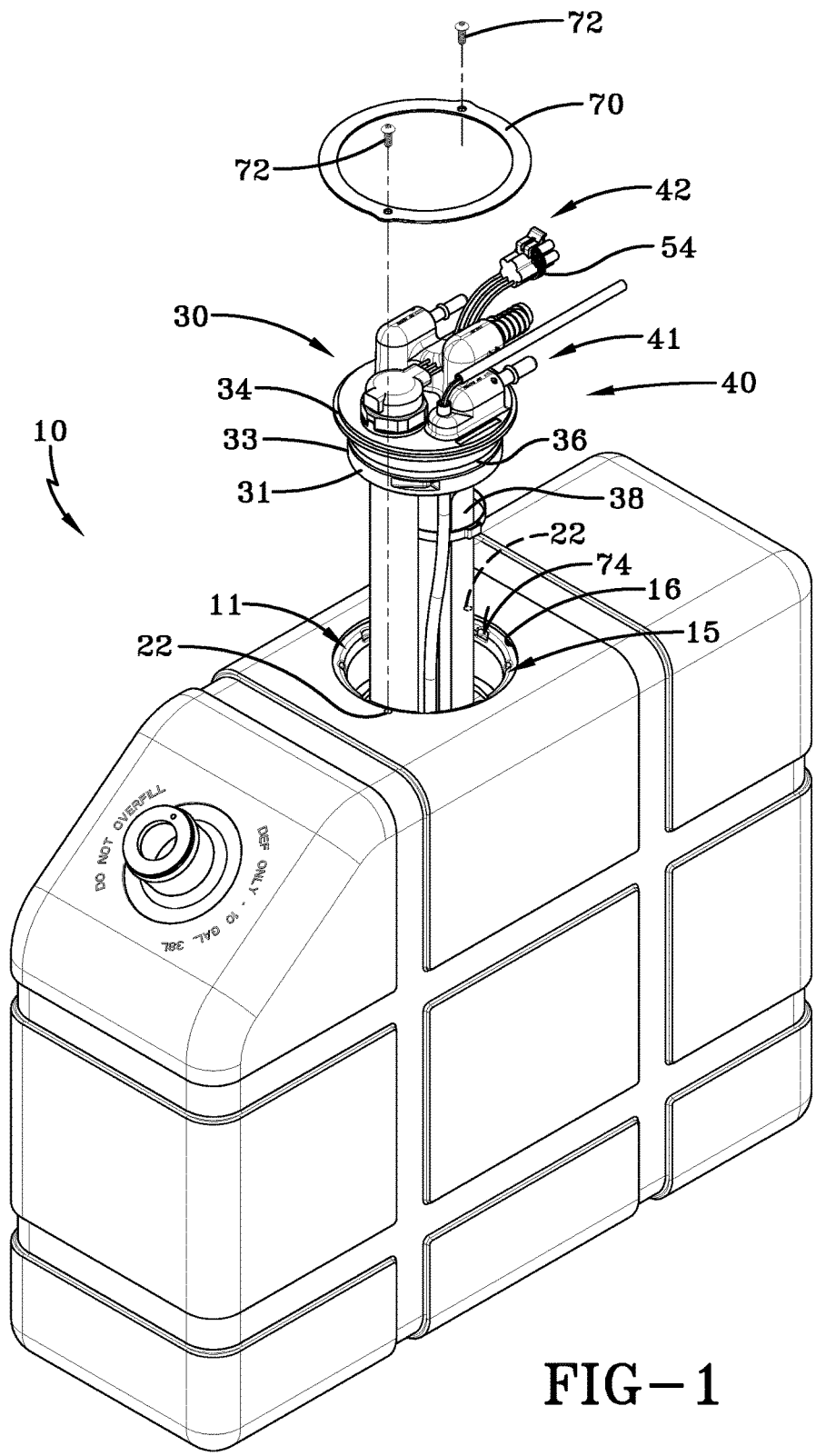
FIG. 1 is a perspective view of a reservoir and multifunction head unit according to the present invention.

A reservoir or tank according to the concepts of the present invention is generally indicated by the number 10 in the drawings. The terms tank and reservoir will be used interchangeably throughout the following description to refer to any container used to at least temporarily store liquid or vapor. In general, the tank 10 is used in a vehicle (not shown). In the example shown, the tank 10 is used to hold diesel emissions fluid (DEF) and is adapted for use with an emissions control system in a diesel vehicle. It will be appreciated that the tank 10 may used in other similar applications.

In the example shown in FIG. 1, tank 10 is a molded tank formed by rotomolding or blow-molding. However, other fabrication techniques may be used. Tank 10 includes an interface 11 that is adapted to receive a mounting head or other connection described in more detail below. The interface 11 includes an aperture defined by a wall 12 that extends into the interior of the tank 10. Wall 12 may have any shape including the cylindrical shape shown. Interface 11 may be formed separately and affixed within tank 10, or as depicted in the drawings, tank 10 and interface 11 may be formed integrally as a monolithic part.

Interface 11 may include a shelf portion generally indicated by the number 15 extending radially outward from wall 12. Shelf portion 15 may be recessed relative to the outer surface of tank 10 to form a rabbet 16. Rabbet 16 may receive a flange or fastening ring used in connection with an individual component or a multi-function head, described below, that fits into interface 11. A channel 19 may be formed about wall 12 and include a base portion 18 spaced inwardly from shelf portion 15. Fastener inserts 22 (FIG. 2) may be supported on base portion within channel 19.

Interface 11 may be shaped to conform to a connector, such as a fluid, gas, or electrical connection, used with the tank 10. Alternatively, in accordance with another aspect of the present invention, interface 11 may be shaped to receive a multi-function head unit or head module, generally indicated by the number 30 in the drawings. Head unit 30 generally includes an inwardly extending rim 31 that is receivable within the opening defined by wall 12 of interface 11. Inwardly extending rim 31 may have any shape including the cylindrical shape shown. In general, rim 31 conforms to wall 12 to facilitate sealing engagement between inwardly extending rim 31 and wall 12, as described more completely below. A flange 32 may extend radially outward from an outer end 33 of inwardly extending rim 31 to engage tank 10 and prevent over insertion of head unit 30. Flange 32 may be sized to seat within rabbet 16 causing the outer surface 34 of rim 32 to lie flush with the surface of tank 10.

A seal 36 is located between inwardly extending rim 31 and wall 12 to form a seal between the head unit 30 and interface 11. In this way, the seal is maintained as long as the head unit 30 resides within the aperture formed by interface 11 and is thus not dependent on the use of fasteners to maintain a surface seal as is common in the art.

In the example shown, seal 36 is mounted on inwardly extending rim 31 and extends radially outward therefrom to sealingly engage wall 12. It will be appreciated that seal 36 may be provided on wall 12 and extend inward to engage inwardly extending rim 31 to the same effect. Seal 36 may be constructed of any suitable seal material including, for example, elastomeric materials. In the example shown, seal 36 is a rubber O-ring. Inwardly extending rim 31 may define a groove 36a to locate and retain the seal 36 in a desired position. In the example shown, seal 36 is located approximately half-way between flange 32 and the end 32a of inwardly extending rim 31. It will be appreciated that other seals may be used. As a further alternative, inwardly extending rim 31 or wall 12 may be coated with a suitable sealing material to effect a seal upon insertion of the head unit 30 within interface 11.

Once head unit 30 is installed in interface 11, a seal is created. In the example shown, the seal is liquid tight. It will be appreciated that a vapor or gas tight seal may also be created with this configuration. Since a seal is created upon insertion of head unit 30 within interface 11, the seal is not dependent upon adequately secured fasteners as is common in the art. As shown, a mounting ring 70 and fasteners 72 may be used to retain the head unit 30 relative to tank 10 if desired. However, the torque on the fasteners (if threaded fasteners are used) is not critical to the effectiveness of the seal. In the example shown, fasteners 72 may be driven through ring 70 and into fastener inserts 22.

Figure 2:
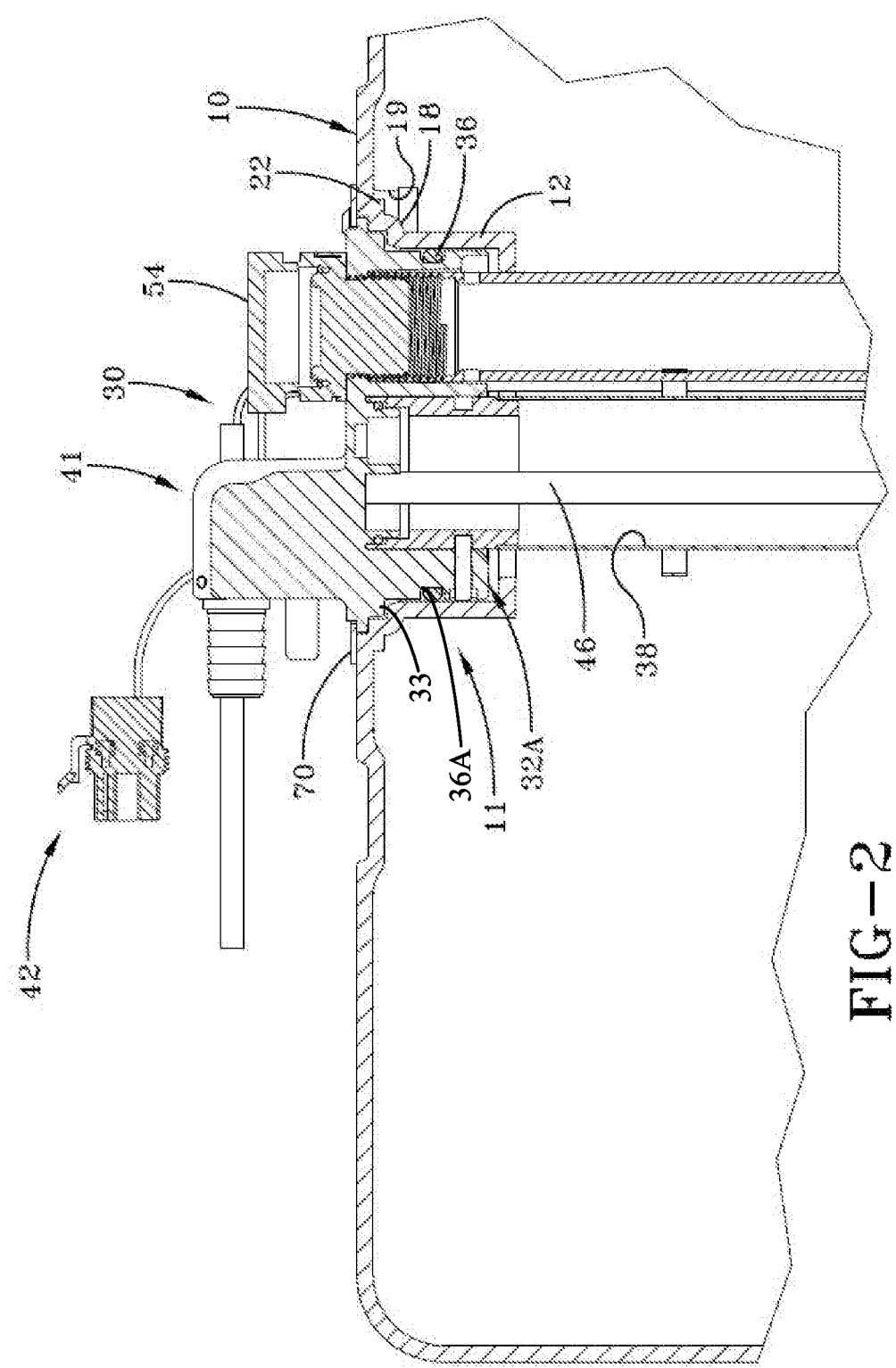
FIG. 2 is a cross-section of the reservoir and multifunction head unit shown in FIG. 1.
Figure 3:
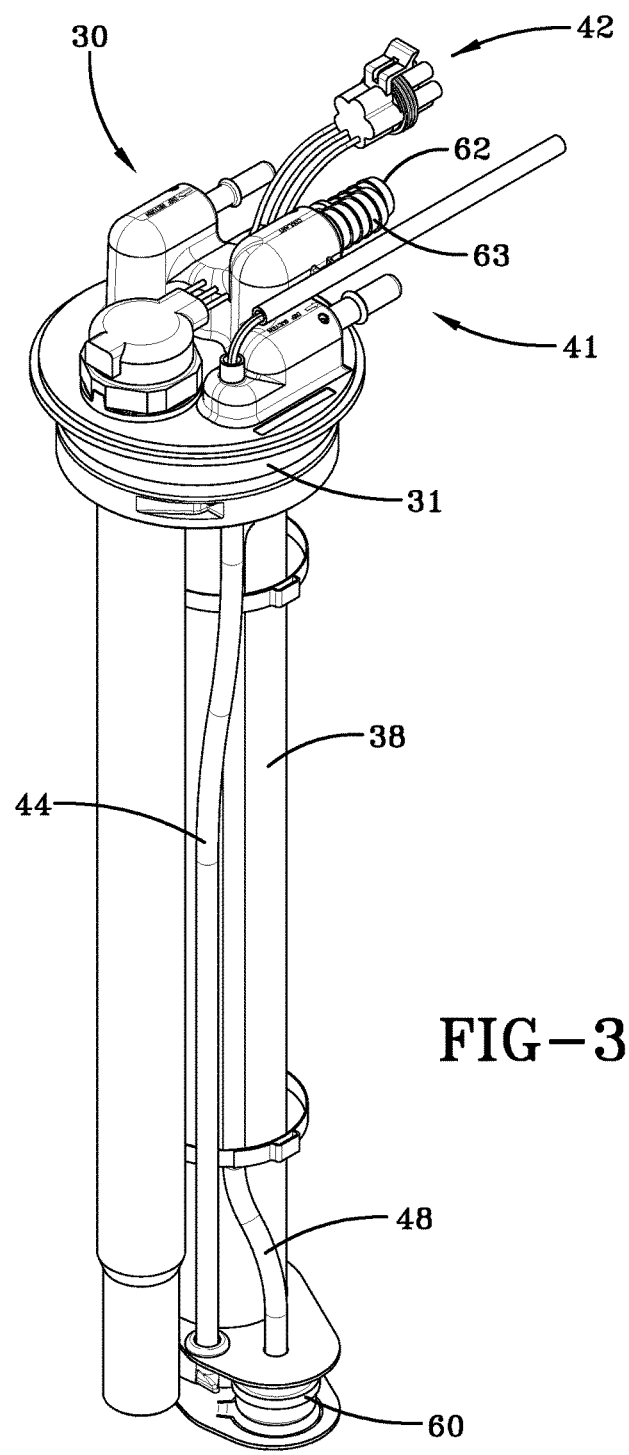
FIG. 3 is a perspective of the multifunction head unit shown in FIG. 1.

Referring to FIG. 1, head unit 30 may include one or more connectors, generally indicated by the number 40. To facilitate connecting the tank 10 to multiple components within a vehicle through a single interface 11, head unit 30 may include multiple connectors. For example as best shown in FIG. 3, head unit 30 includes a plurality of fluid connectors 41 and electrical connectors 42 in a single unit. Advantageously, connectors 40 may be molded into the head unit 30 (FIG. 2).

Figure 4:
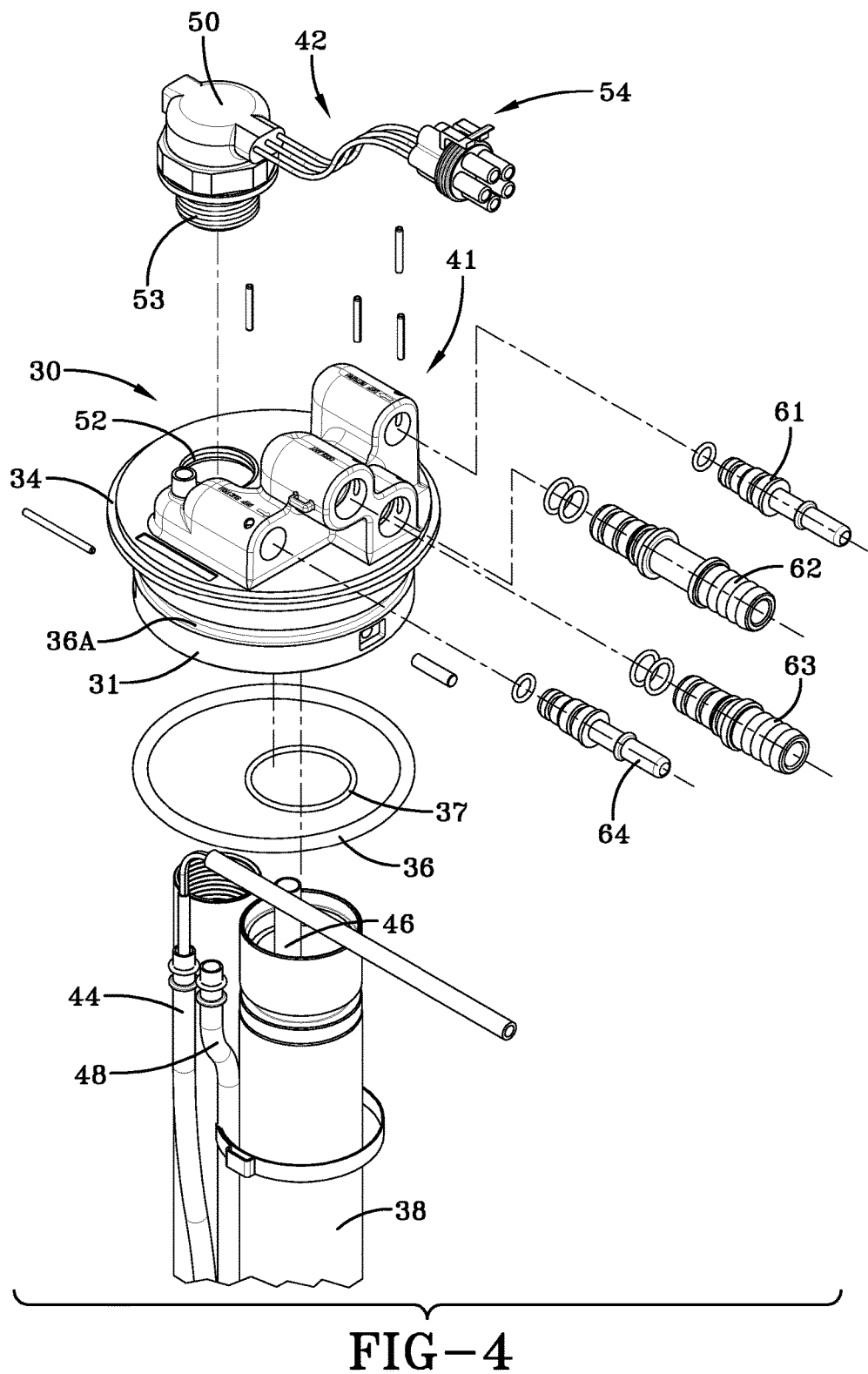
FIG. 4 is an exploded perspective view of the multifunction head unit shown in FIG. 3.

The fluid connectors 41 are used for DEF fluid supply to the vehicle and DEF fluid return to tank 10. Also, in one embodiment shown in the figures, coolant supply and coolant return connections are also provided to convey heated fluid from the vehicle radiator the DEF tank 10 and return this fluid to the vehicle radiator. In other embodiments, an electrical heater may be used in place of the fluid heater. The electrical connections 42 may include a temperature sensor and a fluid sensor. In one embodiment, a single electrical connector 42 is provided to connect the temperature and level sensors to a DEF control system. For example, as shown in FIG. 2, electrical connector 42 includes a 5 position connector 54. Three of the positions connectors are used for an ultrasonic level sensor 50 and two connectors are used for temperature sensor 44. In an alternate embodiment, only the level sensor is connected using the 5 position connector 54 and a separate connector or connectors are used for the temperature sensor. The ultrasonic level sensor 50 may be connected to a level sensor tube (not shown) that extends to near the bottom of tank 10. The level sensor 50 measures the fluid level of DEF in tank 10. As best shown in FIG. 4, head unit 30 may be provided with an internally threaded bore 52 for receipt of a threaded end 53 of level sensor 50.

With respect to fluid connector(s) 41, in the example shown in FIG. 3, there are two DEF fluid connectors 41, DEF suction or supply 64 and DEF return 61. Two coolant connections are also provided, coolant supply 62 and coolant return 63. As better seen in FIGS. 3 and 5, a variety of connection configurations may be used depending on the particular application. Consequently, the connections shown should not be considered limiting. For example, for the DEF application, Society of Automotive Engineer (SAE) connections are incorporated into head unit 30 to facilitate use of the head unit 30 with the fluid, gas, and other conduits found in the vehicle. In the particular example shown, coolant supply and coolant return connections 62, 63 include barbed fittings and DEF suction or supply 64 and DEF return 61 include SAE J2044 fittings.

Referring now to FIGS. 3 and 4, a heater tube 38 attaches to the underside of the head unit 30. The two coolant connections 62, 63 communicate with the interior of the heater tube 38. An O-ring 37 is used to isolate the heater tube from the interior of tank 10. The coolant supply 62 is connected to a coolant bubbler tube 46, which conveys heated coolant to the lower end of the heater tube to prevent short circuiting of the heated coolant through the heater tube 38. The coolant return 63 takes suction from the top of the heater tube 38.

The DEF suction 64 is connected to a suction line 48, which has a suction strainer 60 at its lower end that extends to near the bottom of tank 10. The DEF return 61 extends just through the head unit 30 and returns DEF at the top of tank 10.

Figure 5:
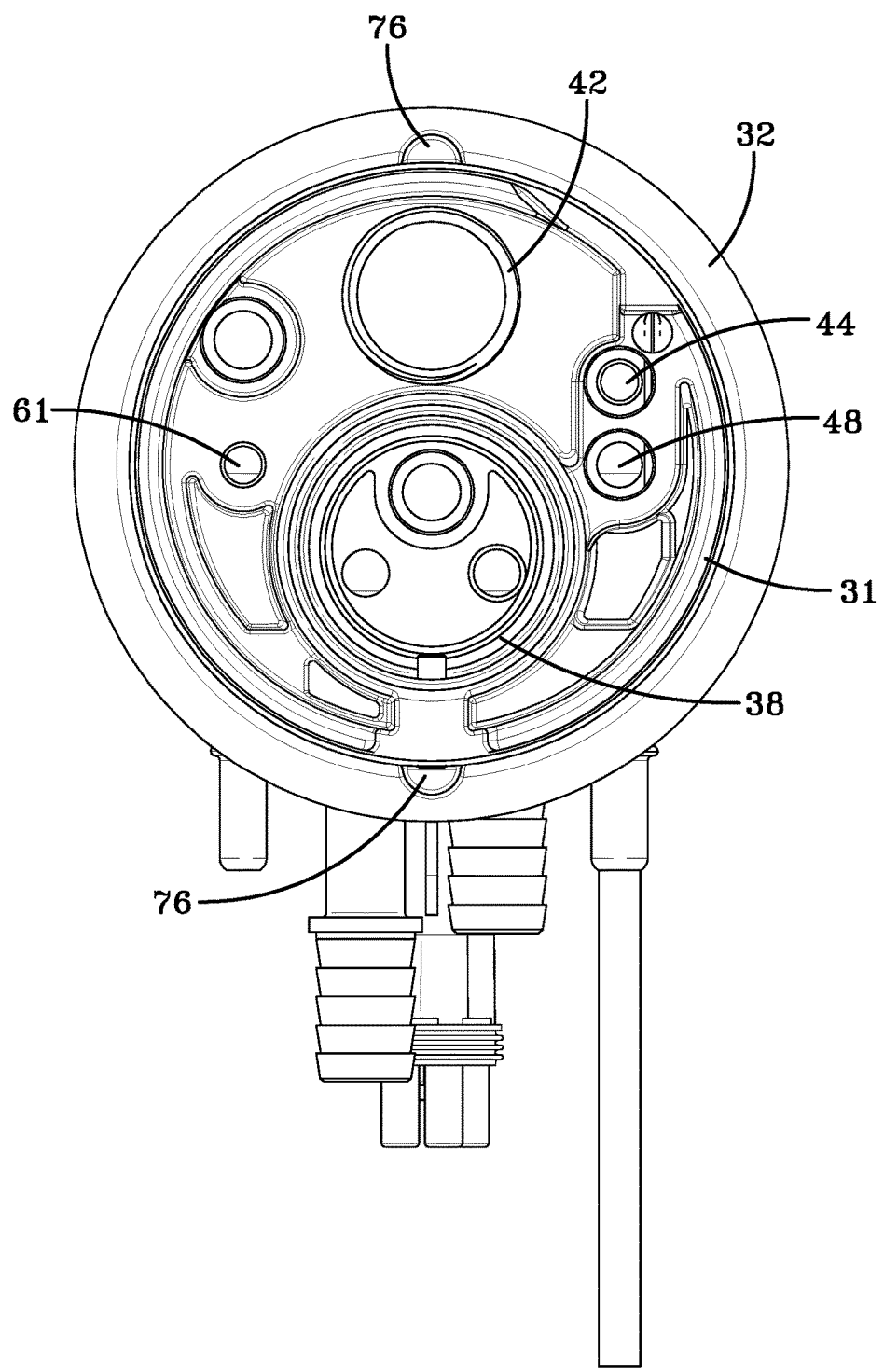
FIG. 5 is a bottom view of the multifunction head unit shown in FIG. 2 with the in reservoir components removed for clarity.
Figure 6:
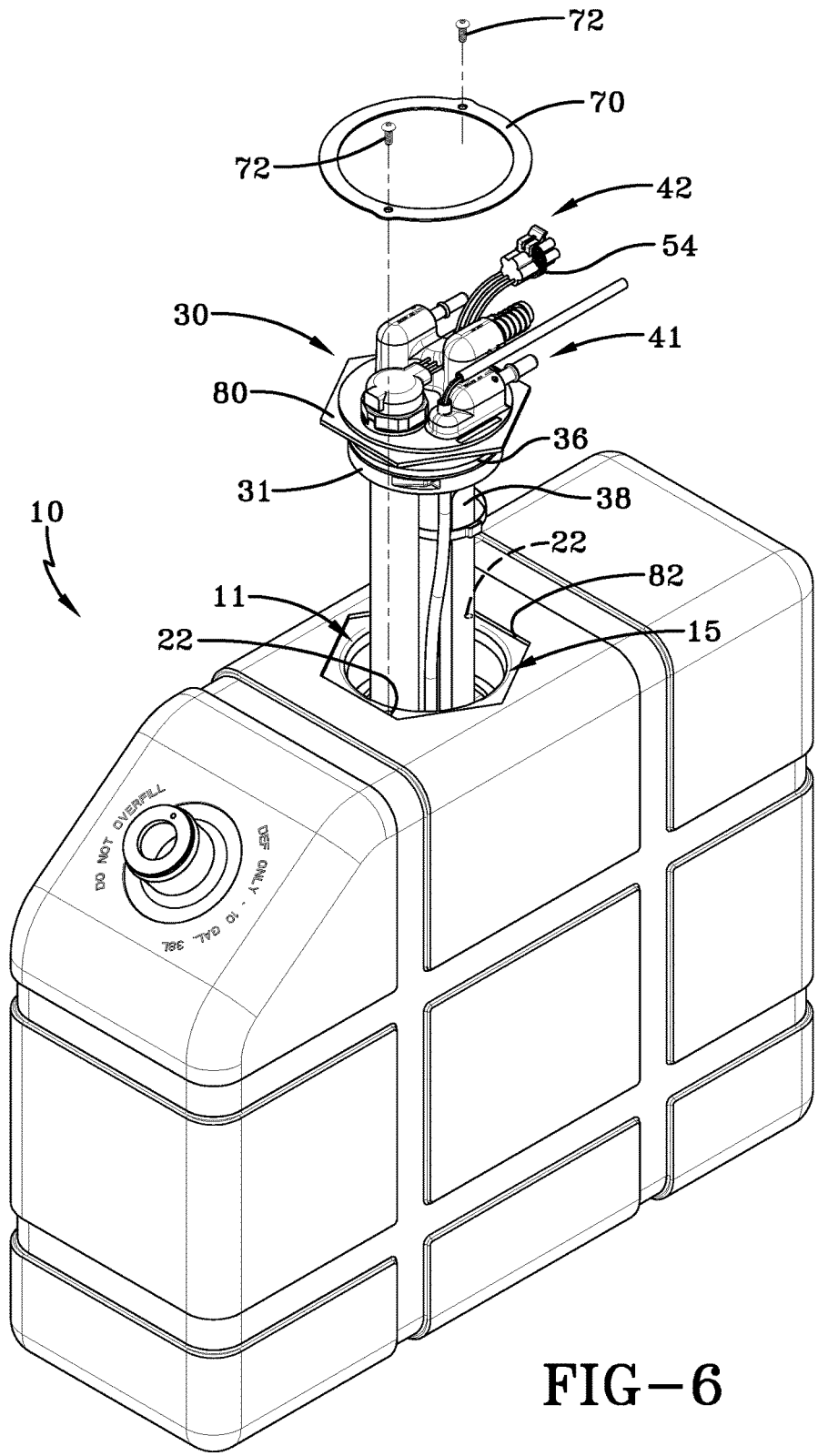
FIG. 6 is a partially cut away view similar to FIG. 1 showing an alternative embodiment of the present invention.
Figure 7:
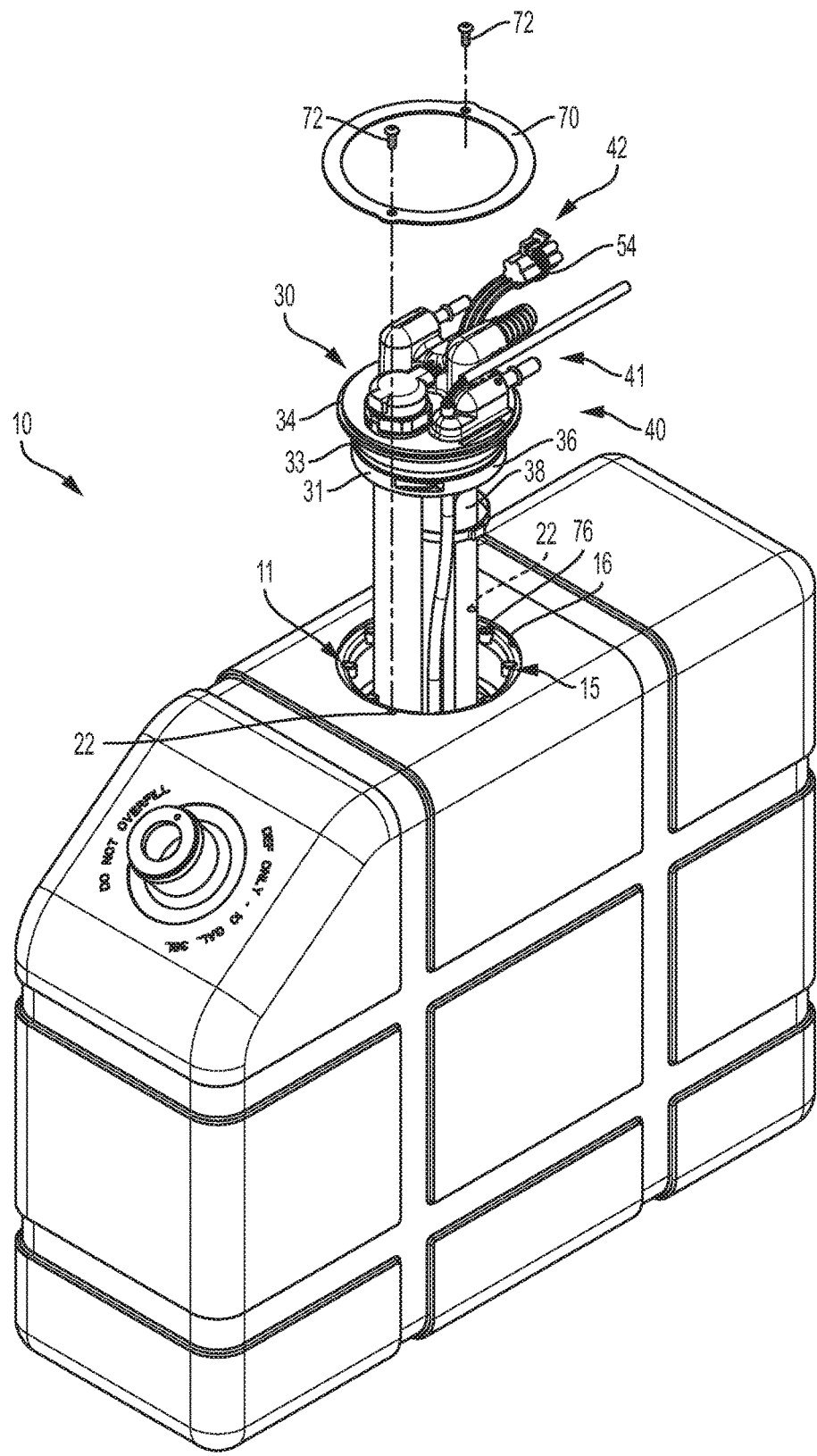
FIG. 7 is a perspective view of a reservoir and multifunction head unit according to another aspect the present invention.
Figure 8:
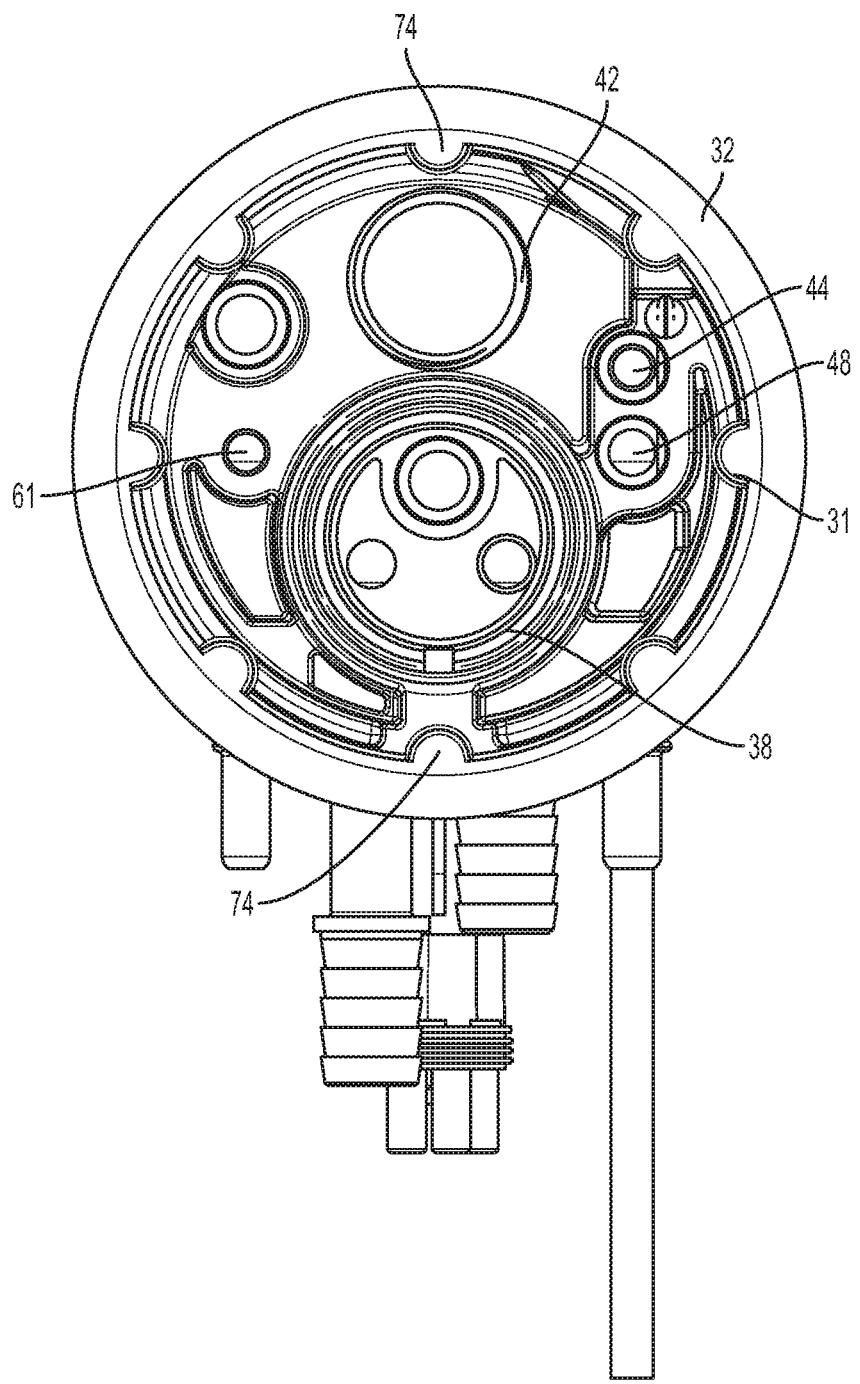
FIG. 8 is a bottom view of a multifunction head unit for use with the reservoir of FIG. 7 with the in reservoir components removed for clarity.

In accordance with another aspect of the invention, head unit 30 may be rotationally clocked to selected rotational positions to accommodate the location of tank 10 and orientation of connectors 40 for various vehicles. To that end, interface 11 may include at least one facet 82 adapted to engage a corresponding facet 80 on the head unit 30 to prevent relative rotation between interface 11 and head unit 30. It will be appreciated that multiple facets may be used to define multiple rotational positions in which head unit 30 may be seated within interface 11. For example, a polygonal interface 11 and correspondingly shaped head unit 30 (FIG. 6) may be used to define rotational positions by the geometry of the polygon. For example, a regular hexagonal shape may be used to define six equally spaced rotational positions. Alternatively, recesses and lugs may be formed on either of the tank 10 or head unit 30 to engage corresponding recesses or lugs on the opposite component. For example, as shown in FIGS. 1 and 5, rim 31 fits within a recessed circular rabbet or groove 16 circumscribing interface 11 in the upper surface of tank 10. A plurality of recesses 74 are formed in groove 16. The underside of head unit flange 32 has at least on lug 76 (FIG. 5) extending inwardly therefrom, which engages one of the recesses 74. This engagement of lug 76 with a recess 74 prevents the head unit 30 from rotating after being installed in tank 10. The plurality of recesses 74 formed about groove 16 allows the head unit 30 to be installed in different orientations as required by the particular vehicle the unit is installed in. In a preferred embodiment shown in the figures, eight recesses are provided. Other quantities of recesses may be used to create a desired number of positions for head unit 30. In another example, as shown in FIGS. 7 and 8, the recesses 74 and lugs 76 are formed on the opposite components, i.e., a plurality of lugs 76 are foinied in groove 16 (FIG. 7) and the underside of head unit flange 32 (FIG. 8) has a plurality of recesses 74 which engage the lugs 76.

The foregoing disclosure is illustrative of the present invention and is not to be construed as limiting thereof. Although one or more embodiments of the invention have been described, persons of ordinary skill in the art will readily appreciate that numerous modifications could be made without departing from the scope and spirit of the disclosed invention. As such, it should be understood that all such modifications are intended to be included within the scope of this invention. The written description and drawings illustrate the present invention and are not to be construed as limited to the specific embodiments disclosed.

What is claimed is:

1. In combination:
    a reservoir having an interface defining an aperture therein, the aperture including a wall extending into the reservoir, the reservoir having a recessed groove in an upper surface about the aperture, the recessed groove including a plurality of recesses spaced about thereon, said reservoir and said interface being formed as a monolithic part; and
    a head unit having an exterior shape complementary to the shape of the interface, said head unit including at least one lug corresponding to said recesses on said interface, the head unit being positionable within the aperture in a plurality of discrete functioning angular orientations with respect to the reservoir and fastened to the reservoir; wherein all of the plurality of angular orientations create a sealed connection between the head unit and the reservoir; the head unit having an inwardly extending rim corresponding to the aperture wall, the head unit having a seal ring mounted on said inwardly extending rim, the seal ring engaging the aperture wall and the head unit inwardly extending rim irrespective of fastening pressure, wherein said head unit includes a connector communicating with an interior of the reservoir.

2. The combination of claim 1, wherein the connector of the head unit includes a plurality of fluid connections.

3. The combination of claim 2, wherein the fluid connections comprise a fluid suction and a fluid return.

4. The combination of claim 1, wherein said reservoir and interface are formed by rotomolding.

5. In combination:
    a reservoir having an interface defining an aperture therein, the aperture including a wall extending into the reservoir, the reservoir having a recessed groove in an upper surface about the aperture, the recessed groove including a plurality of recesses spaced about thereon, said reservoir and said interface being formed as a monolithic part;
    a head unit having an exterior shape complementary to the shape of the interface, said head unit including at least one lug corresponding to said recesses on said interface, the head unit being positionable within the aperture the plurality of recesses in a plurality of discrete functioning angular orientations with respect to the reservoir and fastened to the reservoir; wherein all of the plurality of angular orientations create a sealed connection between the head unit and the reservoir; the head unit having an inwardly extending rim corresponding to the aperture wall, the head unit having a seal ring mounted on said inwardly extending rim, the seal ring engaging the aperture wall and the head unit inwardly extending rim irrespective of fastening pressure, wherein said head unit includes a connector communicating with an interior of the reservoir; the connector includes a plurality of fluid connections; the fluid connections comprise a fluid suction and a fluid return; and the fluid connections further comprise a coolant supply and a coolant return.

6. In combination:
    a reservoir having an interface defining an aperture therein, the aperture including a wall extending into the reservoir, the reservoir having a recessed groove in an upper surface about the aperture, the recessed groove including a plurality of recesses spaced about thereon, said reservoir and said interface being formed as a monolithic part;
    a head unit having an exterior shape complementary to the shape of the interface, said head unit including at least one lug corresponding to said recesses on said interface, the head unit being positionable within the aperture in a plurality of discrete functioning angular orientations with respect to the reservoir and fastened to the reservoir; wherein all of the plurality of angular orientations create a sealed connection between the head unit and the reservoir; the head unit having an inwardly extending rim corresponding to the aperture wall, the head unit having a seal ring mounted on said inwardly extending rim, the seal ring engaging the aperture wall and the head unit inwardly extending rim irrespective of fastening pressure, wherein said head unit includes a connector communicating with an interior of the reservoir;
    the head unit further comprises a level sensor; and the connector includes a plurality of fluid connections.

7. In combination:
    a reservoir having an interface defining an aperture therein, the aperture including a wall extending into the reservoir, the reservoir having a recessed groove in an upper surface about the aperture, the recessed groove including a plurality of recesses spaced about thereon, said reservoir and said interface being formed as a monolithic part;
    a head unit having an exterior shape complementary to the shape of the interface, said head unit including at least one lug corresponding to said recesses on said interface, the head unit being positionable within the aperture in a plurality of discrete functioning angular orientations with respect to the reservoir and fastened to the reservoir; wherein all of the plurality of angular orientations create a sealed connection between the head unit and the reservoir; the head unit having an inwardly extending rim corresponding to the aperture wall, the head unit having a seal ring mounted on said inwardly extending rim, the seal ring engaging the aperture wall and the head unit inwardly extending rim irrespective of fastening pressure, wherein said head unit includes a connector communicating with an interior of the reservoir; the head unit further comprises a temperature sensor; and the connector includes a plurality of fluid connections.

8. In combination:
a reservoir having an interface defining an aperture therein, the aperture including a wall extending into the reservoir, the reservoir having a recessed groove in an upper surface about the aperture, the recessed groove including a plurality of recesses spaced about thereon, said reservoir and said interface being formed as a monolithic part; and
a head unit having an exterior shape complementary to the shape of the interface, said head unit including a plurality of lugs corresponding to said plurality of recesses on said head unit being positionable within the aperture in a plurality of discrete functioning angular orientations with respect to the reservoir and fastened to the reservoir; wherein all of the plurality of angular orientations create a sealed connection between the head unit and the reservoir; the head unit having an inwardly extending rim corresponding to the aperture wall, the head unit having a seal ring mounted on said inwardly extending rim, the seal ring engaging the aperture wall and the head unit inwardly extending rim irrespective of fastening pressure, wherein said head unit includes a connector communicating with an interior of the reservoir.

9. In combination:
a reservoir having an interface defining an aperture therein, the aperture including a wall extending into the reservoir, the reservoir having a recessed groove in an upper surface about the aperture, the recessed groove including at least one recess thereon; and
a head unit having an exterior shape complementary to the shape of the interface, said head unit including at least one lug corresponding to said recess on said interface, the head unit being positioned within the aperture; the head unit having an inwardly extending rim corresponding to the aperture wall, the head unit having a seal ring mounted on said inwardly extending rim, the seal ring engaging the aperture wall and the head unit inwardly extending rim, wherein said head unit includes a connector communicating with an interior of the reservoir; wherein the head unit further comprises:
a plurality of fluid connections extending from an upper side of the head unit to a lower side of the head unit;
a temperature sensor attached to the lower side of the head unit;
a level sensor attached to the head unit;
a heater tube attached to the lower side of the head unit;
two of the fluid connections extending into the interior of the heater of the heater tube, one of said two fluid connections extending to a lower end of the heater tube, the other of said two fluid connections terminating proximate the lower said of the head unit;
a suction tube connected to a further one of the fluid connections, the suction tube extending outside of the heater tube;
a further one of the fluid connections terminating proximate the lower side of the head unit outside of the heater tube.

10. A head unit comprising:
an inwardly extending rim including a lug and a seal ring capable of engaging an interface with a recess thus creating a seal;
a plurality of fluid connections extending from an upper side of the head unit to a lower side of the heat unit;
a temperature sensor attached to the lower side of the head unit;
a level sensor attached to the head unit;
a heater tube attached to the lower side of the heat unit;
two of the fluid connections extending into the interior of the heater tube, one of said two fluid connections extending to a lower end of the heater tube, the other of said two fluid connections terminating proximate the lower side of the head unit;
a suction tube connected to a further one of the fluid connections, the suction tube extending outside of the heater tube;
a further one of the fluid connections terminating proximate the lower side of the head unit outside of the heater tube.

11. In combination:
a reservoir having an interface defining an aperture therein, the aperture including a wall extending into the reservoir, the reservoir having a recessed groove in an upper surface about the aperture, the recessed groove including a first rotational engaging means, said reservoir and said interface being formed as a monolithic part; and
a head unit having an exterior shape complementary to the shape of the interface, said head unit including second rotational engaging means complementary to the first rotational engaging means on the interface, the first rotational engaging means and second rotational engaging means allowing the head unit to be positioned within the aperture in a plurality of discrete functioning angular orientations with respect to the reservoir, the head unit fastened to the reservoir; wherein all of the plurality of angular orientations create a sealed connection between the head unit and the reservoir; the head unit having an inwardly extending rim corresponding to the aperture wall, the head unit having a seal ring mounted on said inwardly extending rim, the seal ring engaging the aperture wall and the head unit inwardly extending rim irrespective of fastening pressure, wherein the head unit includes a connector communicating with an interior of the reservoir.

12. The combination of claim 11, wherein the first rotational engaging means includes a first plurality of facets and the second rotational engaging means comprises a second plurality of facets.

13. The combination of claim 11, wherein the first rotational engaging means includes a plurality of recesses and the second rotational engaging means comprises at least one lug.

14. The combination of claim 11, wherein the first rotational engaging means includes at least one lug and the second rotational engaging means comprises a plurality of recesses.

15. The combination of claim 12, wherein the interface and head unit are polygonal shaped.

16. The combination of claim 15, wherein the interface and head unit are hexagonally shaped.

* * * * *